Patented July 7, 1931

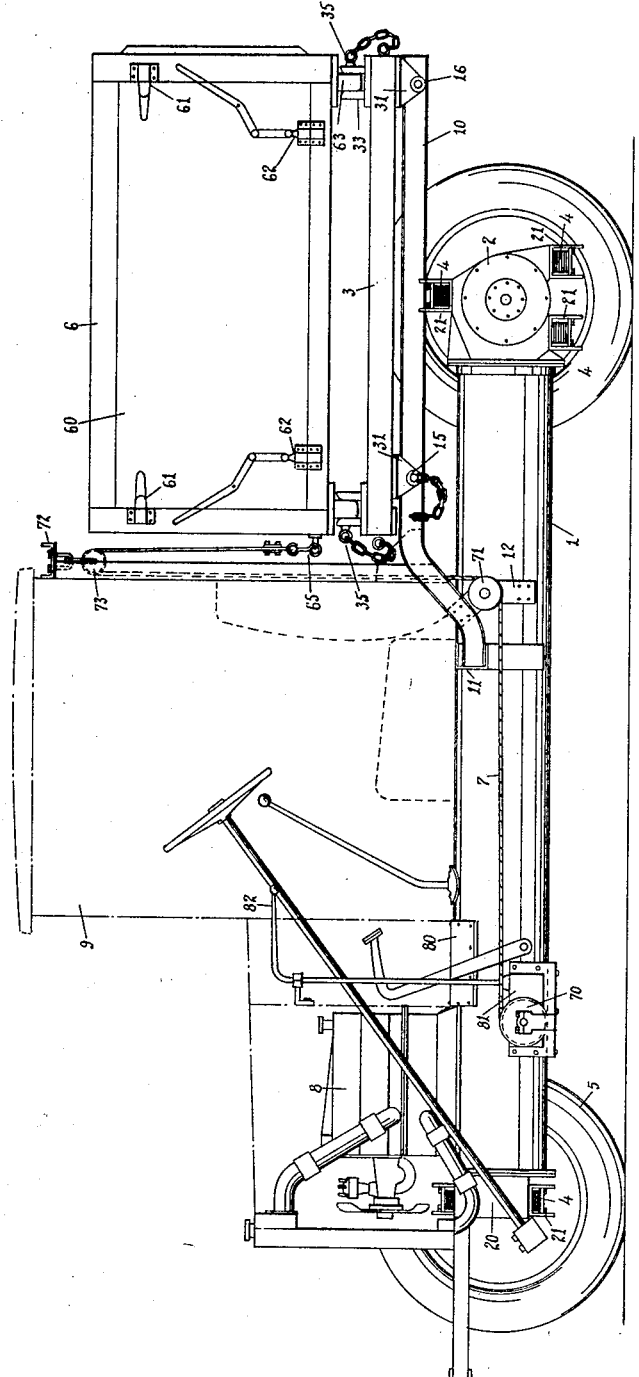

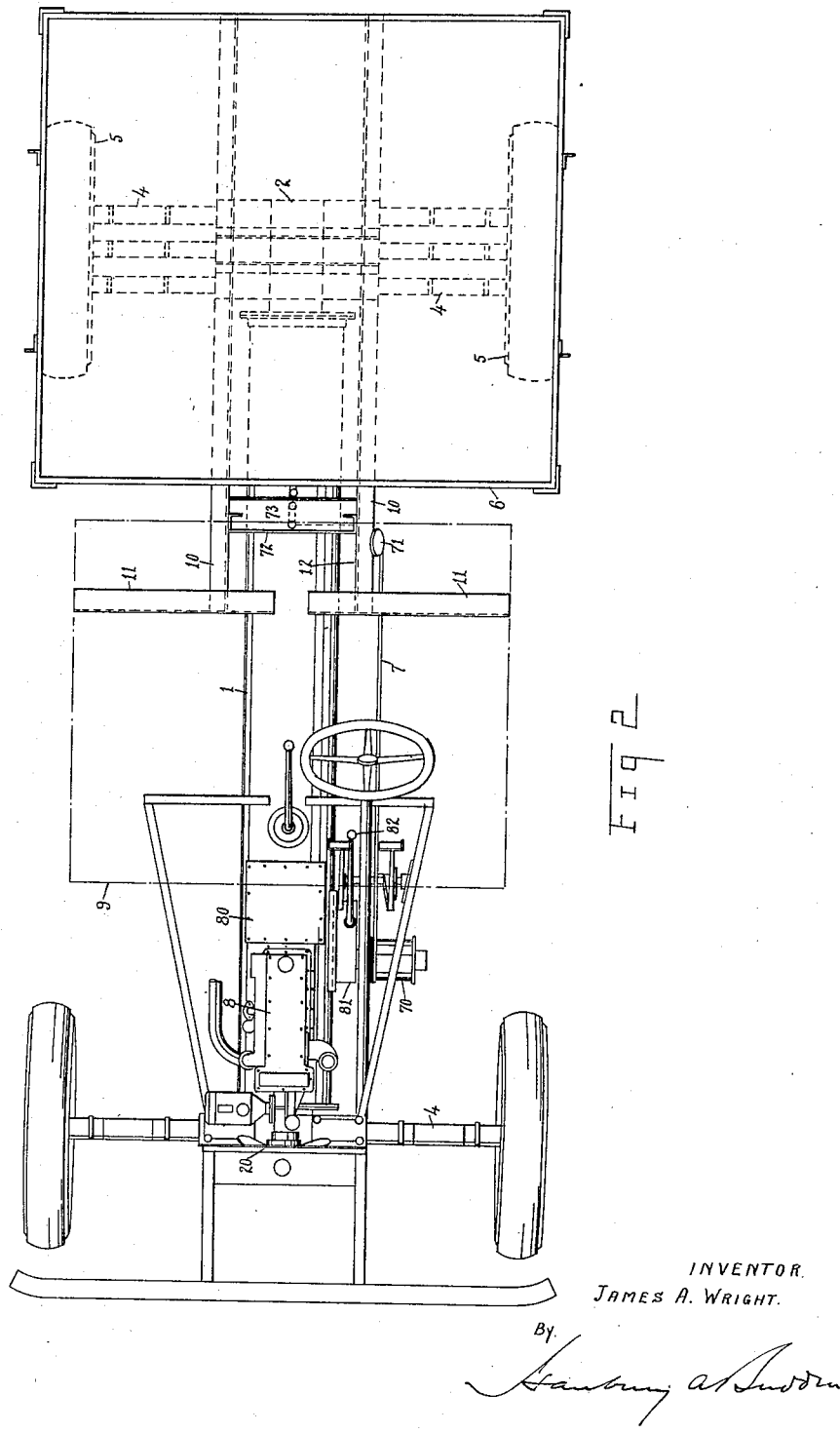

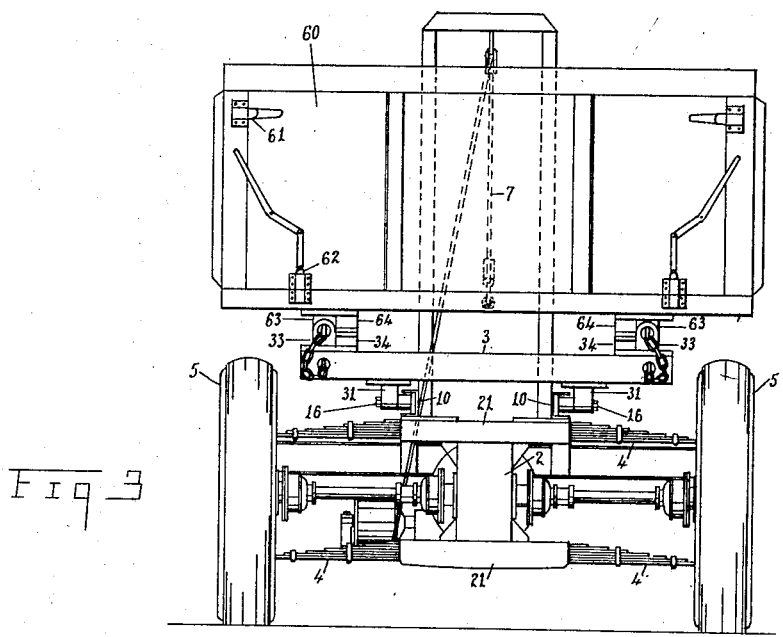

1,812,915

UNITED STATES PATENT OFFICE

JAMES A. WRIGHT, OF MONTREAL, QUEBEC, CANADA

DUMP TRUCK

Application filed December 7, 1927. Serial No. 238,403.

This invention relates to motor vehicles and particularly to improvements in dump trucks and the like.

The object of the invention is to provide a dump truck mounted on a chassis having a transverse spring suspension, whereby greater stability and safety is secured.

A further object is to provide a dump truck mounted on a chassis and adapted to dump its load at either side or at the rear end.

A further object is to provide a dump truck in which the spring suspension and wheel mounting reduce the effect of road stresses on the vehicle and thereby secure greater durability and economy in repairs and replacements.

It is recognized that dump trucks are exposed to very rough usage and are employed on ground of a very uneven character. Furthermore the load of a dump truck is a movable load and its center of gravity may be at varying distances from the vertical axis of the vehicle.

Dump trucks must therefore be prepared to meet conditions somewhat different from those to which other motor vehicles are subjected.

This invention is designed to meet these unusual conditions by means of novel features to be set forth hereinafter.

It consists of a motor chassis mounted on transverse springs providing independent wheel action. The frame comprises a central large torque tube connected to the differential casing, with rear extension side members connected to the torque tube and to the casing.

This frame supports a load box, with sides and rear end pivoted to swing outwardly. The load box is mounted to dump to the rear or to either side and mechanism driven by the motor is adapted to raise and lower it for these operations.

Reference is made to the accompanying drawings in which:

Fig. 1 is a side view with the near wheels removed.

Fig. 2 is a plan view with the cab and hood removed.

Fig. 3 is a rear view.

Fig. 4 is an enlarged detail view of one form of box seats.

Fig. 5 is a side view showing end dumping.

Fig. 6 is an end view showing side dumping.

The frame of the truck comprises the torque tube 1, the differential casing 2, and the front yoke block 20. Transverse springs 4, seated in seats 21, are coupled at their ends to the wheels 5, preferably in the load plane thereof.

The motor 8, and transmission 80, are mounted in the torque tube 1, at its front end.

Channel brackets 11, are riveted to the torque tube 1, and extend on either side beneath the cab 9, which they support.

The subframe 10, consists of side channels riveted to the brackets 11, adjacent the torque tube 1, at their front ends and secured to the spring seats 21, on the top of the differential casing 2, beyond which they extend rearwardly.

The side channels 10, are offset upwardly at their front ends, to pass over the differential casing 2.

A central elevator frame 72, is riveted to the subframe 10, at a point immediately behind the cab 9. A bracket 12, secured to the torque tube 1, and to the subframe 10, has a pulley 71, journalled on it. A pulley 73, is hung from the center of the top of the elevator frame 72.

Mounted on the side of the torque tube 1, at the side of the transmission 80, is a reduction gear box 81, in which a winding drum 70, is journalled and connected by gear to the motor drive in the transmission 80. A lever 82, controls the operation of the winding drum 70.

On the subframe 10, a table 3, is mounted, having brackets 31, pivoted by the pins 16, to the rear ends of the channel members, and brackets 31, detachably secured to the subframe 10, by the removable pins 15, at the front end of the table 3.

The load box 6 with its side and end doors 60, hinged at 61, 61, and provided with locking latches 62, is supported at its four corners on the table 3, through rest blocks 64, and 34, and pivot bearings 63, and 33, in which removable pivot pins 35, are journalled.

A preferred form of the rest blocks 64, and 34 is shown in Fig. 4, in which the lower block 34, has an upwardly projecting cone 340, adapted to enter and center in a conical recess 640, in the bottom of the upper block 64.

The elevator cable 7, is secured to the center of the load box 6, at the lower edge of its front end, and passes over the pulley 73, and under the pulley 71, to the drum 70, upon which it is wound.

With a construction such as is above set forth, a dump truck of many novel features is provided. The frame of the chassis with its large torque tube extending from the yoke block of the front wheel assembly to the differential casing with its seats for the transverse springs coupled to the rear wheels, the side brackets secured to the torque tube which support the cab, and the subframe secured at its front end to the torque tube through the brackets and to the differential casing, forming a very substantial and stable base on which the dump box and its operating mechanism is mounted.

This base carries its load at its center and distributes it through the transverse springs to the load plane of the wheels. The wheels being independent, tend to hold the road and also to surmount obstacles with the minimum effect on the frame, owing to the resilience of the transverse springs. These features are of great value and importance when the character of the road bed on which dump trucks are employed, is considered. Whereas with the standard form of frame with wheels mounted on solid axles, the road shocks are transmitted from one wheel to the other and to the frame through the springs on each side of the chassis.

The load box with its doors adapted to swing outwards, is journalled on removable pins outside the socket supports which are mounted at the sides of the table which is supported on the narrow subframe and thence on the main frame. This table is journalled at the rear end of the subframe and is supported at its front end on the subframe to which it is secured by removable pins.

The elevating cable is secured to the bottom of the front end of the load box at its center.

When the pins securing the front end of the table to the subframe are removed and the elevator drum is driven by the motor to wind up the cable, the front end of the load box is raised and on releasing the latches of the rear door it swings outwardly and permits the load to be dumped behind the truck. If it is desired to dump the load to either side of the truck, the table being secured by the pins to the subframe, the pins on one side of the load box are removed to permit it to pivot on the pins on the other side. Upon operating the elevator the load box is tilted up and when its side door is unlatched the door opens outwardly and permits the load to be dumped over the side of the truck.

Dump trucks are subjected to unbalanced loads in loading and in side dumping as well as from uneven road beds. They are also affected by centrifugal forces when rounding curves. These conditions cause the center of gravity to be changed from the vertical axis of the truck to positions towards the sides, varying in distance. The stability of the truck under such conditions is a matter of the greatest importance. By means of the system whereby the load is carried centrally on the differential casing and then transferred through the springs to the load plane of the wheels, and whereby torsional stresses produced in the differential casing are absorbed by the torque tube forming the central member of the frame, and by the upper and lower transverse springs, the effect of stresses tending to cause instability is overcome to an extent hitherto unobtainable in trucks mounted on frames with side springs coupled to solid axles.

What I claim is:—

In a dump truck, a central frame adapted to centrally support a dumping body in its operating positions, the dumping body comprising a table supported on pivots on the central frame, pivotal rest blocks at the corners of the table, upwardly projecting conical seats on the rest blocks, and a load box having pivotal rest blocks and conically bored seats adapted to fit over the conical seats.

JAMES A. WRIGHT.